United States Patent
Teranishi et al.

(10) Patent No.: US 9,802,143 B2
(45) Date of Patent: Oct. 31, 2017

(54) CERAMIC FILTER

(71) Applicant: NGK Insulators, Ltd., Nagoya (JP)

(72) Inventors: Makoto Teranishi, Nagoya (JP);
Hideyuki Suzuki, Nagoya (JP);
Manabu Isomura, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 546 days.

(21) Appl. No.: 13/735,233

(22) Filed: Jan. 7, 2013

(65) Prior Publication Data

US 2013/0126420 A1    May 23, 2013

Related U.S. Application Data

(63) Continuation of application No. PCT/JP2011/065933, filed on Jul. 13, 2011.

(30) Foreign Application Priority Data

Jul. 14, 2010   (JP) ................. 2010-159902

(51) Int. Cl.
*B01D 39/20*    (2006.01)
*B01D 63/06*    (2006.01)
(Continued)

(52) U.S. Cl.
CPC ..... *B01D 39/2068* (2013.01); *B01D 39/2075* (2013.01); *B01D 46/2429* (2013.01);
(Continued)

(58) Field of Classification Search
CPC .. B01D 71/025; B01D 71/04; C04B 38/0012; C04B 41/5023; C03C 8/24
(Continued)

(56) References Cited

U.S. PATENT DOCUMENTS 3,019,116 A * 1/1962 Doucette ............... 501/153
6,545,947 B1   4/2003 Morozumi et al.
(Continued)

FOREIGN PATENT DOCUMENTS

JP   06-188332 A1   7/1994
JP   10-180060 A1   7/1998
(Continued)

OTHER PUBLICATIONS

Wypych, George (2010). Handbook of Fillers (3rd Edition). p. No. 17.*

(Continued)

*Primary Examiner* — Pranav Patel
(74) *Attorney, Agent, or Firm* — Burr & Brown, PLLC

(57) ABSTRACT

A ceramic filter is provided with a porous substrate 3 "made of ceramic and having partition walls 1 separating and forming a plurality of cells 2 extending from one end face 11 to the other end face 12", a separation membrane 21 "made of ceramic and disposed on wall surfaces of the cells 2", and glass seals 31 disposed on the one end face 11 and on the other end face 12 "so as not to cover openings of the cells 2". Ceramic particles having a thermal expansion coefficient of 90 to 110% of that of glass contained in the glass seals 31 are dispersed in the glass seals 31. There is provided a ceramic filter usable for a long period of time in high temperature conditions.

4 Claims, 3 Drawing Sheets

(51) Int. Cl.
  *B01D 69/02* (2006.01)
  *B01D 71/02* (2006.01)
  *C04B 38/00* (2006.01)
  *B01D 46/24* (2006.01)
  *C04B 35/111* (2006.01)
  *C03C 3/078* (2006.01)
  *C03C 3/093* (2006.01)
  *C03C 8/02* (2006.01)
  *C03C 8/14* (2006.01)
  *C04B 111/00* (2006.01)

(52) U.S. Cl.
  CPC ........... *B01D 63/066* (2013.01); *B01D 69/02* (2013.01); *B01D 71/024* (2013.01); *B01D 71/025* (2013.01); *B01D 71/028* (2013.01); *C03C 3/078* (2013.01); *C03C 3/093* (2013.01); *C03C 8/02* (2013.01); *C03C 8/14* (2013.01); *C04B 35/111* (2013.01); *C04B 38/0012* (2013.01); *B01D 2239/0478* (2013.01); *B01D 2313/04* (2013.01); *B01D 2325/22* (2013.01); *C04B 2111/00793* (2013.01); *C04B 2235/36* (2013.01); *C04B 2235/5436* (2013.01); *C04B 2235/5445* (2013.01); *C04B 2235/6021* (2013.01); *C04B 2235/6562* (2013.01); *C04B 2235/6565* (2013.01); *C04B 2235/9607* (2013.01)

(58) Field of Classification Search
  USPC ..... 210/496, 490, 483, 486, 497.01, 500.26, 210/506; 429/402
  See application file for complete search history.

(56) References Cited

U.S. PATENT DOCUMENTS

| | | |
|---|---|---|
| 2004/0151882 A1 | 8/2004 | Tani et al. |
| 2006/0213165 A1 | 9/2006 | Isomura et al. |
| 2009/0214923 A1 | 8/2009 | Takahashi et al. |
| 2010/0331164 A1 | 12/2010 | Lamberson et al. |
| 2011/0174722 A1 | 7/2011 | Yano et al. |
| 2011/0268976 A1 | 11/2011 | Lamberson et al. |

FOREIGN PATENT DOCUMENTS

| | | |
|---|---|---|
| JP | 2002-112394 A1 | 4/2002 |
| JP | 2004-119691 A1 | 4/2004 |
| JP | 2005-106685 A1 | 4/2005 |
| JP | 2006-263498 A1 | 10/2006 |
| JP | 2009-110851 A1 | 5/2009 |
| JP | 2009-195864 A1 | 9/2009 |
| JP | 2009-195866 A1 | 9/2009 |
| JP | 4367678 B2 | 11/2009 |
| WO | 2010/038281 A1 | 4/2010 |
| WO | 2011/002842 A1 | 1/2011 |

OTHER PUBLICATIONS

Canadian Office Action (Application No. 2,805,251) dated Jan. 23, 2014.
Canadian Office Action, Canadian Application No. 2,805,251, dated Sep. 10, 2015 (3 pages).
Extended European Search Report (Application No. 11806806.3) dated Mar. 9, 2016.

* cited by examiner

CERAMIC FILTER

BACKGROUND OF THE INVENTION

Technical Field

The present invention relates to a ceramic filter and, more specifically, to a ceramic filter usable for a long period of time in high temperature conditions.

Description of Related Art

A ceramic filter using a ceramic porous body has high reliability since it is excellent in mechanical strength and durability in comparison with a polymer membrane. In addition, since a ceramic filter has high corrosion resistance, it has little deterioration upon chemical washing with acid, alkali, or the like, and further it is possible to precisely control the average pore size, which determines filtration performance. Since the ceramic filter has such various advantages, it is used for filtrating and removing suspended substances, bacteria, dust, and the like present in a fluid such as liquid and gas in not only the fields of a water treatment and an exhaust gas treatment, but also a wide range of fields including pharmaceutical and food fields. In addition, it is used for pervaporation of separating and refining a liquid mixture of two or more components and for gas separation of separating and refining a gas mixture of two or more components.

As a ceramic filter, there is used, for example, a ceramic filter provided with a columnar porous substrate made of ceramic and having a plurality of cells, which are "through-holes extending from one end face to the other end face"; a separation membrane made of ceramic and disposed on wall surfaces of the cells; and glass seals disposed so as to cover the and faces of the porous substrate; or the like (see, e.g., Patent Document 1). This enables to enhance fluid permeability inside the element while maintaining the filtration performance.

PRIOR ART DOCUMENT

Patent Document

Patent Document 1: JP-A-2006-263498

SUMMARY OF THE INVENTION

Problems to be Solved by the Invention

Though a ceramic filter according to Patent Document 1 is a filter having high corrosion resistance, which can effectively remove suspended substances, bacteria, dust, and the like, present in a fluid such as liquid and gas, it has a problem of causing a crack when it is used for a long period of time in high temperature conditions. Also, in the case that it is exposed to an alkali aqueous solution having high temperature upon manufacturing, such as a case of disposing a zeolite separation membrane on a substrate, there is a case of causing a crack.

The present invention has been made in view of such problems of the prior art and provides a ceramic filter usable for a long period of time in high temperature condition.

According to the present invention, there is provided a ceramic filter as described below.

[1] A ceramic filter provided with: a porous substrate made of ceramic and having partition walls separating and forming cells extending from one end face to the other end face, a separation membrane made of ceramic and disposed on wall surfaces of the cells, and glass seals disposed on the one end face and on the other end face so as not to cover openings of the cells; wherein ceramic particles having a thermal expansion coefficient of 90 to 110% of that of glass contained in the glass seals are dispersed in the glass seals.

[2] The ceramic filter according to [1], wherein a material for the ceramic particles is alumina or titania.

[3] The ceramic filter according to [1] or [2], wherein an area occupancy of the ceramic particles with respect to the entire glass seals is 5 to 50%.

According to a ceramic filter of the present invention, since ceramic particles having a thermal expansion coefficient of 90 to 110% of that of "glass contained in the glass seals" are dispersed in the glass seals disposed on the end faces of the porous substrate, it can be used for along period of time in a high temperature condition.

DETAILED DESCRIPTION OF THE INVENTION

Hereinbelow, an embodiment of the present invention will be described. However, the present invention is not limited to the following embodiment, and it should be understood that an embodiment obtained by suitably making changes, improvements, and the like to the following embodiments on the basis of ordinary knowledge of a person of ordinary skill in the art within the range of not deviating from the gist of the present invention is included in the scope of the present invention.

Figure 1:
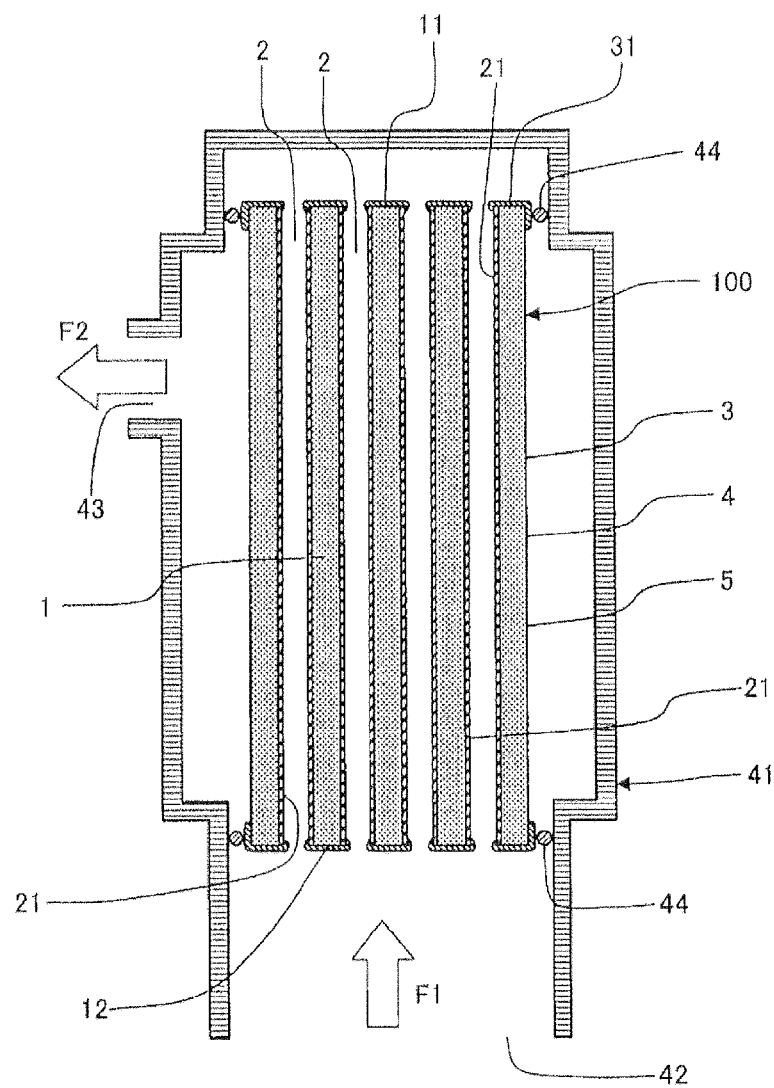
FIG. 1 is a schematic view showing a state that one embodiment of a ceramic filter of the present invention is attached to a housing, showing a "cross section parallel to the cell extension direction" of the ceramic filter.

(1) Ceramic Filter:

As shown in FIG. 1, an embodiment of a ceramic filter of the present invention has a porous substrate 3 "made of ceramic and having partition walls 1 separating and forming a plurality of cells 2 extending from one end face 11 to the other end face 12 and an outer peripheral wall 4 located in the outermost periphery", a separation membrane 21 "made of ceramic and disposed on wall surfaces of the cells 2", and glass seals 31 disposed "on the one end face 11 and on the other end face 12 so as not to cover openings of the cells 2"; wherein ceramic particles having a thermal expansion coefficient of 90 to 110% of that of glass contained in the glass seals 31 (glass portions in the glass seals 31) are dispersed in the glass seals 31. Here, "wall surfaces of the cells 2" mean the "surfaces of the partition walls 1" exposed to the inside of the cells 2. Though it is preferable that the porous substrate 3 has a plurality of cells 2, it may have one cell 2. FIG. 1 is a schematic view showing a state where one embodiment of a ceramic filter of the present invention is attached to a housing 41, showing a "cross section parallel to the cell 2 extension direction" of the ceramic filter 100.

Thus, in the ceramic filter 100 of the present embodiment, since ceramic particles are dispersed in the glass seals 31 disposed on the end face of the porous substrate 3, even if thermal stress is applied thereto by the use in high temperature conditions, the stress is relaxed due to the presence of the ceramic particles to enables the use for a long period of time in high temperature conditions. Further, since the thermal expansion coefficient of the ceramic particles is 90 to 110% of that of the glass contained in the glass seals 31, there can be inhibited "crack generation in the glass seals 31 due to the difference in thermal expansion between the glass contained in the glass seals 31 and ceramic particles" when the ceramic filter 100 is used in high temperature conditions. In the case of a complex shape of a honeycomb shape as the ceramic filter 100 of the present embodiment, residual stress is easily caused in the manufacturing process. In particular, it is considered that the residual stress is easily caused in a ceramic filter having a large honeycomb shape of 5000 cm$^3$ or more. Therefore, in such a ceramic filter having a large honeycomb shape, a crack is easily caused in the glass seals. Therefore, a ceramic filter of the present invention particularly remarkably exhibits an effect of inhibiting crack generation in the glass seals when it has a large honeycomb shape.

Hereinbelow, the ceramic filter 100 of the present embodiment will be described for every constituent element.

Figure 2:
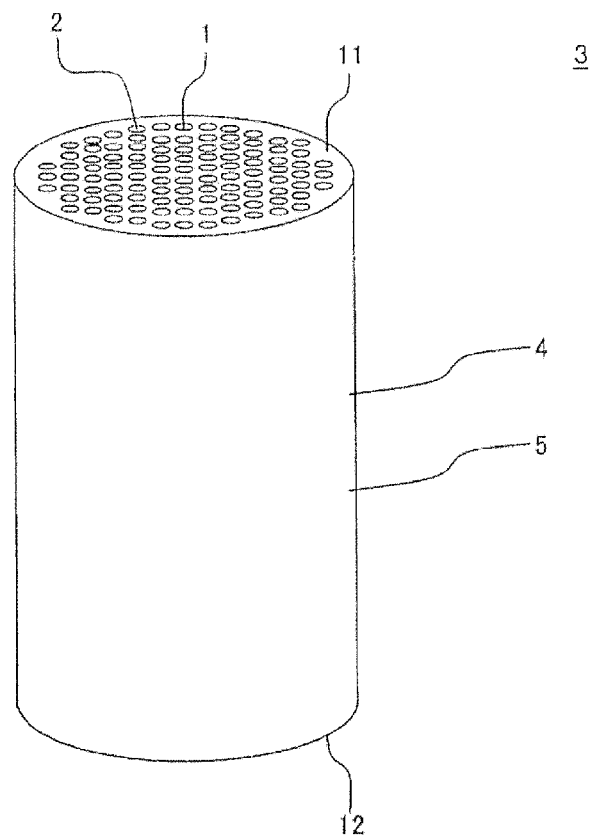
FIG. 2 is a perspective view schematically showing a porous substrate constituting one embodiment of a ceramic filter of the present invention.

(1-1) Porous Substrate:

In the ceramic filter 100 of the present embodiment (see FIG. 1), as shown in FIG. 2, the porous substrate 3 has partition walls 1 separating and forming a plurality of cells 2 extending from one end face 11 to the other end face 12 and an outer peripheral wall 4 located in the outermost periphery. The material for the porous substrate 3 is ceramic. "The outer peripheral wall 4 is located in the outermost periphery of the porous substrate 3" means that the outer peripheral wall 4 is located in the outermost periphery "in a cross section perpendicular to the cell extension direction of the porous substrate 3". FIG. 2 is a perspective view schematically showing a porous substrate 3 constituting one embodiment of a ceramic filter of the present invention.

The average pore size of the partition walls and the outer peripheral wall constituting the porous substrate is determined in consideration of a balance between mechanical strength and filtration resistance. Generally, the average pore size is preferably 1 to 100 μm. In addition, the porosity is preferably 25 to 50%. The average pore size and porosity are values measured by a mercury porosimeter.

It is preferable that partition walls constituting the porous substrate has a lamination structure formed of a partition wall main body and a surface layer covering the surface of the partition wall main body. The portion obtained by removing the surface layer from the entire partition wall serves as the partition wall main body, and in this case, the "wall surface inside the cell (surface of the partition wall)" of the porous substrate serves as a surface of the surface layer. It is preferable to dispose a filtration membrane on the surface of the surface layer. In addition, it is preferable that the material for the surface layer is ceramic.

The material for the porous substrate (partition walls, outer peripheral wall) is ceramic, preferably alumina ($Al_2O_3$), titanic ($TiO_2$), mullite ($Al_2O_3 \cdot SiO_2$), zirconia ($ZrO_2$), or the like. Of these, alumina is more preferable because a raw material (framework particles) having a controlled particle diameter can easily be obtained, a stable kneaded material can be formed, and the corrosion resistance is high. As a structure of the partition wall main body of the porous substrate and the surface layer of the porous substrate, there may be selected a structure where at least a part thereof bonds framework particles together by a glass component (sintering auxiliary). A ceramic filter having such a structure can be manufactured by firing at lower temperature and can be produced at lower costs.

The shape of the porous substrate is preferably columnar ("cylindrical" if it is construed to be hollow by the formation of cells) having one end face 11, the other end face 12, and outer peripheral face 5. The shape of the porous substrate is preferably "honeycomb-like" or "monolith-like" because the filtration area per unit volume can be increased, and the treatment performance can be raised.

There is no particular limitation on the entire shape and the size of the porous substrate as long as they do not hinder the filtration function. As the entire shape, there can be mentioned, for example, a circular columnar shape (or a circular cylindrical shape), a quadrangular prismatic shape (or, a cylindrical shape having a quadrangular cross section perpendicular to the central axis), a triangular prismatic shape (or, a cylindrical shape having a triangular cross section perpendicular to the central axis). Of these, a circular columnar shape (or a circular cylindrical shape) is preferable. When it is used for precise filtration or ultrafiltration, it is preferable to employ a circular columnar shape having a diameter of 30 to 180 mm in a cross section perpendicular to the central axis and a length of 150 to 2000 mm in the central axial direction.

As a cross sectional shape of a cell (shape in a cross section perpendicular to the cell extension direction) of a porous substrate, there can be mentioned, for example, a circle and a polygon. As the polygon, there can be mentioned a quadrangle, a pentagon, a hexagon, a triangle, or the like. The cell extension direction is the same as the central axial direction in the case that the porous substrate has a circular columnar (circular cylindrical) shape.

When the cross sectional shape of a cell of the porous substrate is a circle, the diameter of the cell is preferably 1 to 5 mm. When it is smaller than 1 mm, a filtration area may become small if the cell density is fixed. When it is larger than 5 mm, strength of the ceramic filter may be reduced.

When the cross sectional shape of a cell of the porous substrate is a polygon, the partition wall thickness is preferably 0.3 to 2 mm. When it is smaller than 0.3 mm, strength of the ceramic filter may be reduced. When it is larger than 2 mm, the pressure loss upon supplying a fluid may increase.

(1-2) Separation Membrane:

In the ceramic filter of the present embodiment, it is preferable that the separation membrane is made of a ceramic porous body having a plurality of pores formed therein and disposed on the wall surfaces inside the cells (surfaces of the partition walls).

The average pore size of the separation membrane can suitably be determined depending on the filtration performance required (particle diameter of the substance to be removed). For example, in the case of a ceramic filter used for precise filtration or ultrafiltration, it is preferably 0.01 to 1.0 μm. The average pore size of the separation membrane is measured by the air flow method described in ASTM F316. In the case of a ceramic filter used for gas separation or pervaporation, there is no particular limitation on the kind of the "separation membrane", and the kind may suitably be selected from a known carbon monoxide separation membrane, helium separation membrane, hydrogen separation membrane, carbon membrane, MFI-type zeolite membrane, DDR type zeolite membrane, silica membrane, and the like according to the kind of the gas to be separated. As the separation membrane, there can be mentioned, for example, a carbon monoxide separation membrane described in U.S. Pat. No. 4,006,107, a helium separation membrane described in U.S. Pat. No. 3,953,833, a hydrogen separation membrane described in U.S. Pat. No. 3,933,907, a carbon membrane described in JP-A-2003-286018, a DDR type zeolite membrane composite body described in JP-A-2004-66188, and a silica membrane described in WO No. 2008/050812 pamphlet.

As the material for the separation membrane, there can be mentioned alumina ($Al_2O_3$), titania ($TiO_2$), mullite ($Al_2O_3.SiO_2$), zirconia ($ZrO_2$), or the like.

(1-3) Class Seal:

In the ceramic filter of the present embodiment, the glass seals are disposed on one end face and the other end face (both the end faces) of the porous substrate so as not to cover the openings of the cells. It is preferable that the glass seals are disposed so as to cover the entire wall surface portions (portions where walls are present with no pore (cell) being open (no opening pore)) of both the end faces of the porous substrate and brought into contact with the separation membranes disposed on the wall faces inside the cells with no gap (so as to have no gap between the glass seal and the separation membrane). "No gap between the glass seal and the separation membrane" means that an end portion of the cylindrical separation membrane disposed on the wall surface of the cell is brought into contact with the glass seal to form no portion where the wall surface of the porous substrate is exposed between the glass seal and the separation membrane. At this time, a part of the glass seal may enter the cell along the wall surface inside the cell. Even if a part of the glass seal enters the cell, when the opening of the cell is not completely sealed, it means that "the glass seals are disposed on one end face and the other end face of the porous substrate in a state where the openings of the cells are not covered". In the present specification, the glass seal means an entire glass seal where ceramic particles are dispersed. In addition, the entire glass seal where ceramic particles are disposed may be referred to as the "ceramic particle-dispersed glass seal" to clearly distinguish it from the portion of "glass" in the glass seal (glass contained in the glass seal). It is preferable that the glass seals are constituted of glass and ceramic particles.

In addition, as shown in FIG. 1, it is preferable that the glass seals 31 are disposed so as to cover a part of the outer peripheral face 5 of the porous substrate 3 (in the vicinity of the end portions of the porous substrate 3 in the cell 2 extension direction). Upon putting the ceramic filter 100 in the housing 41, it is preferable to seal the gap between the "glass seal 31 disposed on the outer peripheral face 5 of the porous substrate 3" and the housing 41 with a sealing material 44 by arranging the sealing material 44 such as an O-ring between the "glass seal 31 disposed on the outer peripheral face 5 of the porous substrate 3" and the housing 41. Since the surface of the glass seal 31 is flatter and smoother than the outer peripheral face 5 of the porous substrate 3, by disposing a sealing material 44 on the glass seal 31, sealability can be enhanced. In addition, in order to improve sealability when the sealing material 44 is disposed on the glass seal 31, it is preferable that the surface (in particular, the surface of the portion disposed on the outer peripheral surface 5 of the porous substrate 3) of the glass seal 31 has high flatness and smoothness.

Disposition of the glass seals on both the end faces of the porous substrate in the state where no openings of the cells are covered can inhibit the fluid to be treated (e.g., water to be treated) from entering the inside of the porous substrate from an end face (wall surface) of the ceramic filter. As shown in FIG. 1, this allows the fluid F1 to be treated to flow into the cells 2, pass through the separation membrane 21, and enter the inside of the porous substrate 3 when the ceramic filter 100 is put in the housing 41 to supply the fluid F1 to the ceramic filter 100 on one end side. Since the outer peripheral face 5 of the porous substrate 3 is exposed to the porous substrate 3, the treated fluid F2 having entered the porous substrate 3 (the fluid obtained by filtering the fluid F1 to be treated by the separation membrane 21 (e.g., treated water)) is discharged to the outside from the outer peripheral face 5 of the porous substrate 3 (outside the porous substrate 3).

The thermal expansion coefficient of ceramic particles dispersed in the glass seal is 90 to 110% of the thermal expansion coefficient of glass (glass portion in the glass seal) contained in the glass seal. When the thermal expansion coefficient of ceramic particles is 90 to 110% of the thermal expansion coefficient of the glass contained in the glass seal, when the ceramic filter is used in high temperature conditions, "crack generation in the glass seal due to the difference in thermal expansion between the glass seal and the ceramic particles" can be inhibited more effectively. When it is smaller than 90% or larger than 110%, a crack is caused after firing due to a large difference between the thermal expansion coefficient of glass contained in the glass seal and the thermal expansion coefficient of the ceramic particles, which is not preferable. Here, the "thermal expansion coefficient of glass contained in the glass seal" means the thermal expansion coefficient of the "glass" portion excluding the ceramic particles in the glass seal. In addition, it is preferable that the ceramic particles are not dissolved in the glass. The ratio of the thermal expansion coefficient of the ceramic particles to the thermal expansion coefficient of the glass seal (glass portion) may be referred to as the "thermal expansion coefficient ratio".

The material for the ceramic particles dispersed in the glass seal is preferably alumina or titania. The thermal expansion coefficient of alumina is $6.0 \times 10^{-6}$ to $7.5 \times 10^{-6}$/K, and the thermal expansion coefficient of titania is $6.0 \times 10^{-6}$ to $8.0 \times 10^{-6}$/K. In addition, by employing alumina for the material for the porous substrate when the material for the ceramic particles is alumina or titania, the thermal expansion coefficients can be made close among the porous substrate, the glass contained in the glass seal, and the ceramic particles contained in the glass seal. Therefore, when a ceramic filter is used for a long period of time in high temperature conditions, crack generation in the glass seal can effectively be inhibited. It is preferable that the ceramic particles are uniformly dispersed in the glass seal.

The area ratio (area occupancy) of the ceramic particles to that of the entire glass seal (ceramic particle-dispersed glass seal) (hereinbelow, sometimes referred to as the "area occupancy of ceramic particles") is preferably 5 to 50%, more preferably 35 to 50%, particularly preferably 35 to 45%. When it is smaller than 5%, it may become difficult to use the glass seal for a long period of time in high temperature conditions. When it is larger than 50%, the sealability (impermeability) of the glass seal may be deteriorated. The aforementioned "area occupancy" of ceramic particles is a value obtained by cutting the glass seal (ceramic particle-dispersed glass seal), polishing the cross section, and then observing the reflected electron image using the scanning electron microscope (SEM). More specifically, it is a value obtained by reading the area (120 μm×90 μm) of a cross section of the glass seal (ceramic particle-dispersed glass seal) and the entire area of the ceramic particles (sum of the areas of a plurality of ceramic particles contained in the glass seal) and then calculating the ratio of the entire area of the ceramic particles to the entire area of the glass seal.

The average particle diameter of the ceramic particles is preferably 0.5 to 40 µm, more preferably 2 to 14 µm. When it is smaller than 0.5 µm or larger than 40 µm, a crack may be generated in the glass seal. The average particle diameter of the ceramic particles is a value obtained by selecting 50 ceramic particles at random from the reflected electron image obtained by taking a photograph of a cross section of the glass where ceramic particles are dispersed by the use of a scanning electron microscope (SEM), measuring directed diameters of the 50 ceramic particles selected above, and averaging out the directed diameters obtained above (average value regarding the 50 ceramic particles). The directed diameter means a diameter of each ceramic particle in one direction which is determined on the "reflected electron image".

The ceramic particles are contained in the glass seal (ceramic particle-dispersed glass seal) at a ratio of preferably 5 to 70 mass % (ratio of mass of the ceramic particles to the total mass of the ceramic particles and glass), more preferably 10 to 50 mass %. When it is smaller than 5 mass %, a crack may be generated in the glass seal when a ceramic filter is used for a long period of time in high temperature conditions. When it is larger than 70 mass %, mechanical strength of the glass seal may become low.

The thickness of the glass seal (ceramic particle-dispersed glass seal) is preferably 30 to 500 µm. When it is smaller than 30 µm, the durability may become low. When it is larger than 500 µm, the glass seal may easily stick out into a cell to hinder the inflow of the fluid. In addition, when the glass seal is thick, the ceramic filter may become heavy.

Though there is no particular limitation on the glass contained in the glass seal as long as it can be used as a sealing material which does not pass a fluid therethrough, alkali-free glass is preferable. Since formation of the glass seal with the alkali-free glass enables to suppress the movement of alkali components from the glass seal at an almost complete level, condensation of the alkali components derived from the glass seal at the interface between the porous substrate or the separation membrane and the glass seal is inhibited, and the corrosion resistance of the ceramic filter can be enhanced dramatically. This enables the ceramic filter of the present embodiment to have excellent corrosion resistance to be able to effectively inhibit corrosion of the porous substrate and the separation membrane in the vicinity of the glass seal even after many times of chemical washing.

Generally, the "alkali-free glass" means glass containing no alkali metal oxide at all or very little alkali metal oxide. In the present specification, it means glass where the total content rate of the alkali metal oxide is 1 mole % or less. Incidentally, in the present specification, the "content rate" of a metal oxide in the glass means a value obtained by analyzing a fritted powder constituted of the glass according to an inductively coupled high-frequency plasma emission spectrometry (ICP: inductively coupled plasma atomic emission spectrometer) and quantitating constituent elements contained in the glass. More specifically, in the case of the aforementioned alkali-free glass, it means the ratio of the molar number of a specific element calculated in terms of the oxide to the total molar number of the whole constituent elements of the alkali-free glass calculated in terms of the oxides.

Though the alkali-free glass is extremely preferable from the viewpoint of planning to improve corrosion resistance of the ceramic filter by inhibiting the movement of alkali components from the glass seal, the corrosion resistance of the alkali-free glass itself may be insufficient. In order to improve corrosion resistance of the alkali-free glass itself, it is preferable that the alkali-free glass contains 55 to 65 mol % of silica, 1 to 10 mol % of zirconia, and at least one kind of alkali earth metal oxide selected from the group consisting of calcia, baria, and strontia and that it does not contain zinc oxide practically.

In the alkali-free glass, since an alkali metal oxide having a melting point depression function is not contained, the firing temperature upon forming the glass seals becomes high if it is used as it is, and the processability may become low. Therefore, it is preferable to use the alkali-free glass containing a component having a melting point depression function, such as alumina ($Al_2O_3$) and boron oxide ($B_2O_3$). When such a component is contained, since the melting point of the glass becomes low, the firing temperature upon forming the glass seals can be lowered, and the processability can be enhanced. Further, by allowing the aforementioned component to be contained, since the glass seals can be formed by firing at lower temperature, production at lower costs becomes possible.

(2) Purification Method:

A method for purifying a fluid by the use of the ceramic filter of the present embodiment will be described.

When a fluid (e.g., water) is purified by the use of a ceramic filter 100 of the present embodiment, it is preferable that the fluid to be treated is allowed to flow into the cells 2 from one end face 11 or the other end face 12, that the fluid to be treated flowing into the cells 2 passes through the separation membranes 21 disposed on the wall surfaces of the cells 2 to enter the porous substrate 3 (partition walls and outer peripheral wall) as a treated fluid, and that the treated fluid having entered the porous substrate 3 is discharged to the outside (outside of the porous substrate 3) from the outer peripheral face 5. At this time, suspended substances, bacteria, dust, and the like present in the fluid to be treated are separated by filtering (trapped) by a filtration membrane 21. The ceramic filter 100 of the present embodiment can be used for, for example, separation of a mixture by pervaporation or vapor permeation.

As shown in FIG. 1, since the fluid is purified by the use of the honeycomb-shaped ceramic filter 100 of the present embodiment, it is preferable that the ceramic filter 100 is put in a cylindrical housing 41 having the fluid inlet 42 and the fluid outlet 43, that the fluid F1 to be treated allowed to flow in from the fluid inlet 42 of the housing 41 is purified by the ceramic filter 100, and that the purified fluid (treated fluid F2) is discharged from the fluid outlet 43.

Upon putting the ceramic filter 100 in the housing 41, as shown in FIG. 1, it is preferable to seal the gap between the ceramic filter 100 and the housing 41 at both the end portions of the ceramic filter 100 with sealing materials 44, 44.

Though there is no particular limitation on the material for the housing 41, for example, stainless steel can be mentioned. Though there is no particular limitation on the sealing material 44, for example, an O-ring can be mentioned. As the material for the sealing material 44, there can be mentioned fluorine rubber, silicone rubber, ethylene-propylene rubber, and the like. These materials are suitable for the use for a long period of time at high temperature.

(3) Method for Manufacturing Ceramic Filter:

A method for manufacturing the ceramic filter of the present embodiment is as follows.

(3-1) Porous Substrate:

There is no particular limitation on the method for manufacturing a porous substrate, and a known method can be employed as the method for manufacturing a ceramic porous substrate. For example, there can be employed a method known as a method for manufacturing a ceramic honeycomb structure used for a filter or the like. Specifically, there can be mentioned a method where a forming raw material is prepared by mixing an additives such as a sintering auxiliary and a surfactant together as necessary besides framework particles and a dispersion medium; a kneaded material is prepared by kneading the forming raw material; the kneaded material is formed into a honeycomb shape to obtain a honeycomb formed body; and the honeycomb formed body is dried and fired to obtain a honeycomb structure. In the case that the porous substrate does not have a surface layer, the aforementioned honeycomb structure functions as the porous substrate.

In the case of manufacturing a porous substrate having a surface layer, it is preferable to obtain a porous substrate having a surface layer by manufacturing a honeycomb structure and then applying surface layer-forming slurry to the wall surfaces inside the cells of the honeycomb structure, followed by drying and firing. It is preferable that the surface layer-forming slurry is prepared by, for example, mixing additives such as a surfactant as necessary besides framework particles and a dispersion medium.

(3-2) Separation Membrane:

It is preferable to form the separation membrane by applying membrane-forming slurry to the wall surfaces inside the cells of the porous substrate, followed by drying and firing. It is preferable that the membrane-forming slurry is prepared by, for example, mixing additives such as a surfactant as necessary besides the framework particles and a dispersion medium. The average particle diameter of the framework particles contained in the membrane-forming slurry is preferably 0.1 to 10 μm. Though there is no particular limitation on the method for applying the membrane-forming slurry to the porous substrate, for example, a dipping method can be mentioned.

(3-3) Glass Seal:

The glass seals (ceramic particle-dispersed glass seals) can be formed by applying the glass seal-forming slurry to both the end faces of the ceramic filter, followed by drying and firing. It is preferable that the glass seal-forming slurry is prepared by mixing predetermined ceramic particles (powdered body) with predetermined frit (glass frit) and further mixing water and an organic binder with them. It is preferable to form the frit by mixing predetermined glass raw materials so as to give a predetermined composition, melting them for uniformalization, cooling it, and pulverizing it so as to have an average particle diameter of about 10 to 20 μm.

EXAMPLE

Hereinbelow, a ceramic filter of the present invention will be described in more detail by Examples. However, the present invention is by no means limited to these Examples.

Example 1

By the following method, a honeycomb-shaped ceramic filter having a diameter of an end face of 30 mm was produced.

(Porous Substrate)

To 100 parts by mass of alumina particles (framework particles) having an average particle diameter of 50 μm, 20 parts by mass of frit (sintering auxiliary) was added, and water, a dispersant, and a thickener were further added, followed by mixing and kneading to prepare a kneaded material. The kneaded material was formed into a honeycomb-shape, dried, and fired to produce a porous substrate (porous substrate A) before forming a surface layer. The firing conditions were 1250° C. and one hour, and each of the rates of temperature rise and fall was 100° C./hour.

As the frit, there was used frit obtained by melting a glass raw material containing $SiO_2$ (80 mol %), $Al_2O_3$ (10 mol %), and alkali earth metal (8 mol %) at 1600° C. for uniformalization; cooling it; and then pulverizing it so as to have an average particle diameter of 1 μm.

The porous substrate A obtained above was a honeycomb-shaped alumina porous body where the diameter of a cross section "perpendicular to the cell extension direction" of the cells was 2.6 mm. The shape (outer shape) of the alumina porous body was a circular cylindrical shape where the diameter of the end face (circular outer peripheral shape) was 30 mm and the length in the "cell extension direction" was 20 mm. The number of the cells was 55. The average pore size of the porous substrate A was 10 μm. The average pore size is a value measured by mercury porosimetry. The thermal expansion coefficient of the porous substrate A was $7.0 \times 10^{-6}$/K.

Next, a surface layer of an alumina porous body having a thickness of 150 μm and an average pore size of 0.5 μm was formed on the wall surface in the cell of the porous substrate A. The average pore size was a value measured by the air flow method described in ASTM F316.

In the first place, to 100 parts by mass of alumina particles (framework particles) having an average particle diameter of 31 μm, 14 parts by mass of frit (sintering auxiliary) was added, and further water, a dispersant, and a thickener were added to prepare slurry. Using the slurry, a "surface layer before firing" was formed on the inner peripheral face of the porous substrate A by a filtration membrane-forming method described in JP-B-63-66566. Then, firing was performed in an electric furnace in an ambient atmosphere to form a surface layer. Thus, a porous substrate was obtained. The firing conditions were 950° C. and one hour, and each of the rates of temperature rise and fall was 100° C./hour. Incidentally, as the frit, there was used frit obtained by melting a glass raw material containing $SiO_2$ (77 mol %), $ZrO_2$ (10 mol %), $Li_2O$ (3.5 mol %), $Na_2O$ (4 mol %), $K_2O$ (4 mol %), CaO (0.7 mol %), and MgO (0.8 mol %) at 1600° C. for uniformalization; cooling it; and then pulverizing it so as to have an average particle diameter of 1 μm.

(Formation of Separation Membrane)

Next, on an inner peripheral face (surface of the surface layer) of the porous substrate, there was formed a separation membrane of a titania porous body having a thickness of 10 μm and an average pore size of 0.1 μm. The average pore size is a value measured by the air flow method described in ASTM F316.

The method for forming the separation membrane was the same as the aforementioned method for forming the surface layer except that the slurry was prepared by adding water, a dispersant, and a thickener to titania particles (powder) having an average particle diameter of 0.5 μm as the framework particles, and mixing them.

(Formation of Glass Seal)

Figure 3:
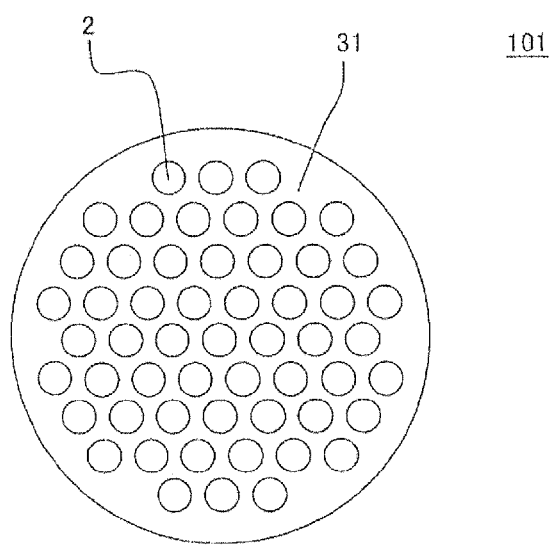
FIG. 3 is a plan view schematically showing a ceramic filter of Example 1.

Next, glass seals were disposed on both the end faces of the porous substrate in the state of not covering openings of the cells to obtain a honeycomb-shaped ceramic filter having a circular cylindrical shape (honeycomb ceramic filter test piece) as shown in FIG. 3. FIG. 3 is a plan view schematically showing a ceramic filter 101 of Example 1.

In the first place, to the frit (glass frit) as a raw material for the glass seals were added water and an organic binder, and they were mixed to prepare slurry. The mixture ratio of alumina particles (ceramic particles) to the total mass of the frit and the alumina particles was 40 mass %. In addition, the mixture ratio of the water was 65 parts by mass when the total mass of the frit and the alumina particles was determined as 100 parts by mass, and the mixture ratio of the organic binder was 7 parts by mass when the total mass of the frit and the alumina particles was determined as 100 parts by mass. As the organic binder, methyl cellulose was used. The thermal expansion coefficient of alumina particles was $6.8 \times 10^{-6}$/K. By applying the slurry obtained above to both the end faces of the porous substrate, followed by drying and firing, a ceramic filter was obtained. The glass seals had a thickness of 200 μm. The firing conditions were the same as the aforementioned method for forming the surface layer. The average particle diameter of the alumina particles (ceramic particles) in the glass seal was 14 μm.

The frit used as the raw material for the glass seals was obtained by melting a glass raw material containing $SiO_2$ (63 mol %), $ZrO_2$ (3 mol %), $Al_2O_3$ (5 mol %), CaO (9 mol %), BaO (17 mol %), and $B_2O_3$ (3 mol %) at 1600° C. for uniformalization; cooling it; and then pulverizing it so as to have an average particle diameter of 15 μm. This made the glass contained the glass seals the alkali-free glass. The frit had a thermal expansion coefficient of $6.7 \times 10^{-6}$/K.

Figure 4:
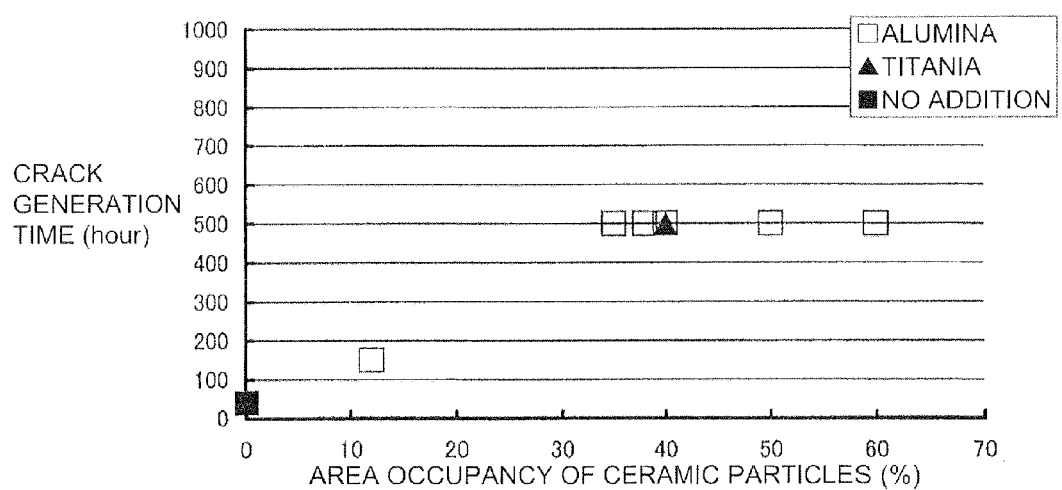
FIG. 4 is a graph showing a relation between the "area occupancy of the ceramic particles" and the "crack generation time (thermal resistance)" regarding the ceramic filters of Examples and Comparative Examples.

The ceramic filter obtained as described above was evaluated for thermal resistance and sealability by the method shown below. In addition, the area occupancy of the ceramic particles was measured. The results are shown in Table 1. In addition, the relation between the area occupancy of the ceramic particles and the crack generation time (thermal resistance) is shown in FIG. 4. The thermal expansion coefficients of the frit used as the raw material for the glass seals, ceramic particles, and porous substrate A are values measured by the following method. The thermal expansion coefficient of the frit functions as the thermal expansion coefficient of the glass portion (portion excluding the ceramic particles) of the glass seals. In Table 1, the "thermal expansion coefficient ratio [ceramic particles/frit]" means the ratio of the thermal expansion coefficient of the ceramic particles to the thermal expansion coefficient of the glass constituting the glass seals. In FIG. 4, "alumina" means a datum of a ceramic filter using alumina as the ceramic particles contained in the glass seals, "titania" means a datum of a ceramic filter using titania as the ceramic particles contained in the glass seals, and "no addition" means a datum of a ceramic filter having the glass seals containing no ceramic particles.

(Thermal Expansion Coefficient)

The prismatic sample of 4 mm×3 mm×20 mm was obtained for the object to be measured to measure the thermal expansion coefficient when the temperature was raised from 50° C. to 500° C. Specifically, the "expansion length" (length when the sample is expanded in the longitudinal direction) of the sample at the time of raising the temperature from 50° C. to 500° C. was measured, and the "expansion length" was divided by the change in temperature (500° C.−50° C.=450° C.) and further divided by the length of the sample in the longitudinal direction (length at 50° C.) to obtain a value as the thermal expansion coefficient.

(Area Occupancy of Ceramic Particles)

The area occupancy of the ceramic particles (ceramic particle area occupancy) is obtained by cutting the ceramic filter obtained above so that the glass seal (ceramic particle-dispersed glass seal) is cut, polishing the cross section of the glass seal, and observing the reflected electron image of the cross section of the glass seal using a scanning electron microscope (SEM). More specifically, it is obtained by reading the area (120 μm×90 μm) of the cross section of the glass seal (ceramic particle-dispersed glass seal) and the entire area of the ceramic particles contained in the glass seal (sum of the areas of a plurality of ceramic particles) and calculating the ratio of the entire area of the ceramic particles to the area of the glass seal.

(Thermal Resistance)

The ceramic filter is put in an autoclave and immersed in water having a temperature of 180° C. to measure the time until a crack is caused in the glass seals.

(Sealability)

A ceramic filter is manufactured in the same conditions as the ceramic filter of each of Examples and Comparative Examples except that the length in the cell extension direction is 160 mm. The ceramic filter is determined as a sample for evaluation regarding the corresponding ceramic filter of each of Examples and Comparative Examples. The samples obtained is put in an immersion container, the immersion container containing the sample is immersed in water (water put in an airtight container), and pressure is reduced in the airtight container including the immersion container to perform deaeration in water. Then, in water, compressed air is introduced in the cells to measure the pressure upon foaming from the glass seals while raising the pressure of the compressed air. The compressed air is changed from 0.15 to 0.25 MPa.

TABLE 1

| | Frit | Ceramic particle | | | | Porous substrate A | Ratio of thermal expansion | Ceramic | Thermal resistance | |
|---|---|---|---|---|---|---|---|---|---|---|
| | Thermal expansion coefficient ($\times 10^{-6}$/K) | Material | Average particle diameter (μm) | Mixture ratio (mass %) | Thermal expansion coefficient ($\times 10^{-6}$/K) | Thermal expansion coefficient ($\times 10^{-6}$/K) | coefficient (ceramic particle/frit) (%) | particle area occupancy (area %) | (Crack generation time) (hour) | Sealability |
| Example 1 | 6.7 | Alumina | 14 | 40 | 6.8 | 7.0 | 101 | 38 | 500 | No foaming |
| Example 2 | 6.7 | Alumina | 2 | 40 | 6.8 | 7.0 | 101 | 40 | 500 | No foaming |
| Example 3 | 6.7 | Alumina | 6.7 | 40 | 6.8 | 7.0 | 101 | 35 | 500 | No foaming |
| Example 4 | 6.7 | Alumina | 6.7 | 10 | 6.8 | 7.0 | 101 | 12 | 150 | No foaming |
| Example 5 | 6.7 | Alumina | 6.7 | 70 | 6.8 | 7.0 | 101 | 60 | 500 | Forming of 0.15 MPa |
| Example 6 | 6.7 | Alumina | 6.7 | 70 | 6.8 | 7.0 | 101 | 50 | 500 | No foaming |
| Example 7 | 67 | Titania | 10 | 40 | 7.2 | 7.0 | 107 | 40 | 500 | No foaming |
| Comp. Ex. 1 | 6.7 | — | — | 0 | — | 7.0 | — | 0 | 40 | No foaming |
| Comp. Ex. 2 | 6.7 | Zirconia | 1 | 40 | 10 | 7.0 | 150 | — | Below 1 | — |

Examples 2 to 7 Comparative Example 2

Ceramic filters were manufactured in the same manner as in Example 1 except that the conditions regarding the frit, ceramic particles, and the porous substrate were changed as shown in Table 1. According to the methods described above, evaluations for the thermal resistance and the sealability were performed. In addition, ceramic particle area occupancy was measured. According to the aforementioned method, thermal expansion coefficients of the frit, ceramic particles, and porous substrate A were measured. The results are shown in Table 1.

Comparative Example 1

A ceramic filter was manufactured in the same manner as in Example 1 except that no ceramic particle was contained in the glass seals. According to the aforementioned methods described above, evaluations for the thermal resistance and the sealability were performed. According to the aforementioned method, thermal expansion coefficients of the frit and porous substrate A were measured. The results are shown in Table 1.

From Table 1, it is understood that crack generation in the glass seals can be suppressed by controlling the thermal expansion coefficient ratio [ceramic particles/frit] to 90 to 110%. In addition, it is understood that, when the ceramic particles have an average particle diameter of 2 to 14 μm, crack generation in the glass seal becomes less.

From Table 1 and FIG. 4, it is understood that the crack generation time becomes shorter (thermal resistance becomes lower) when the area occupancy of the ceramic particles is lower than 35%. From Table 1, it is understood that, when the area occupancy of the ceramic particles is higher than 50%, sealability becomes low. It is considered that this is caused by the formation of pores because the gaps among the ceramic particles cannot be filled with the glass. From these, it is understood that it is more preferable that the ceramic particles have an area occupancy of 35 to 50%.

INDUSTRIAL APPLICABILITY

A ceramic filter of the present invention is used for filtrating and removing suspended substances, bacteria, dust, and the like, present in a fluid such as liquid and gas in not only fields of a water treatment and an exhaust gas treatment, but also wide range of fields including pharmaceutical and food fields. In particular, in the water treatment field such as production of drinkable water or industrial water or purification of sewage or industrial drainage, it can suitably be used for removing suspended substances and harmful substances such as pathogenic organisms in liquid.

DESCRIPTION OF REFERENCE NUMERALS

1: partition wall, 2: cell, 3: porous substrate, 4: outer peripheral wall, 5: outer peripheral face, 11: one end face, 12: the other end face, 21: separation membrane, 31: glass seal, 41: housing, 42: fluid inlet, 43: fluid outlet, 44: sealing material, 100, 101: ceramic filter, F1: fluid to be treated, F2: treated fluid

The invention claimed is:

1. A ceramic filter comprising:
   a porous substrate made of ceramic and having partition walls separating and forming cells extending from one end face to the other end face,
   a separation membrane made of ceramic and disposed on wall surfaces of the cells, and
   glass seals disposed on the one end face and on the other end face so as not to cover openings of the cells;
   wherein the glass seals are constituted of glass constituent and ceramic particles, the ceramic particles have a thermal expansion coefficient of 90 to 110% of that of the glass constituent, and an area of occupancy of the ceramic particles with respect to the entire glass seals is 35 to 50%.

2. A ceramic filter comprising:
   a porous substrate made of ceramic and having partition walls separating and forming cells extending from one end face to the other end face,
   a separation membrane disposed on wall surfaces of the cells, and
   glass seals disposed on the one end face and on the other end face so as not to cover openings of the cells;
   wherein the glass seals are constituted of glass constituent and ceramic particles, the ceramic particles have a thermal expansion coefficient of 90 to 110% of that of the glass constituent, and an area of occupancy of the ceramic particles with respect to the entire glass seals is 35 to 50%.

3. The ceramic filter according to claim 1, wherein a material for the ceramic particles is alumina or titania.

4. The ceramic filter according to claim 2, wherein a material for the ceramic particles is alumina or titania.

* * * * *

UNITED STATES PATENT AND TRADEMARK OFFICE
CERTIFICATE OF CORRECTION

PATENT NO. : 9,802,143 B2  
APPLICATION NO. : 13/735233  
DATED : October 31, 2017  
INVENTOR(S) : Makoto Teranishi, Hideyuki Suzuki and Manabu Isomura Page 1 of 1

It is certified that error appears in the above-identified patent and that said Letters Patent is hereby corrected as shown below:

On the Title Page

Other Publications
Please add: "International Search Report and Written Opinion, dated October 25, 2011."

Signed and Sealed this
Fifth Day of June, 2018

Andrei Iancu
*Director of the United States Patent and Trademark Office*